3,221,480
COATED FORAMINOUS FIBROUS GAS FILTER
Andrew Stefcik, Easton, Pa., and Fred E. Woodward, Watchung, N.J., assignors to General Aniline & Film Corporation, New York, N.Y., a corporation of Delaware
No Drawing. Filed Dec. 27, 1961, Ser. No. 162,585
9 Claims. (Cl. 55—524)

This invention relates to a novel gas filter and more particularly to a foraminous gas filter comprising fibrous material, individual fibers of which are coated with a new and improved, non-volatile viscous liquid film.

Gas filters are commonly employed for the purification of a gas such as air, oxygen, nitrogen, carbon dioxide, or the like by passing the gas through the filter which is normally of a foraminous fibrous structure, the fibers of which are coated with an adhesive or viscous liquid film. The function of this film is to remove any dust or other liquid or solid particles of matter suspended in the gas. For optimum results, this film should be non-flammable, fire-resistant, high boiling and therefore essentially non-volatile, and water soluble so that when the film is completely coated with dirt and dust and therefore no longer adhesive, it may be removed by water and the filter rinsed clean, recoated and reused. In public buildings, there is a very real danger that should a fire or spark occur in the blower or control mechanisms, it would ignite the fluid on the filter fibers and because of the rapid movement of air quickly fill the building with smoke. This could easily cause a panic. It is therefore required for Underwriters Laboratory approval of such installations to use a fluid for coating the filter fibers which is non-flammable by their test. Non-volatility is of course particularly desirable to prevent rapid evaporation of the film in the stream of gas passing therethrough.

While many fluids have been employed for coating foraminous fibrous gas filters, they have commonly been subject to one or more deficiencies with respect to the aforementioned desired functions and properties. Many non-flammable fluids exist which rely on halogen or phosphorous for their non-flammability but which are water insoluble as, for example tricresyl phosphate, tris-β-chlorethylphosphate, chlorinated biphenyl, hexachlorobutadiene, fluorine-containing polymers, etc. Other materials which are non-flammable, but water insoluble, include tetraalkyl silicates, silicone polymers, and the like. Non-flammable fluids can be made from water soluble products but only by incorporating a minimum of 35% water in the formulation such as the well known ethylene glycol-water fluids, thickened with for example polyoxyethylenated polyoxypropylene polymers of the Pluronic type. Such products are no longer non-flammable under conditions in which the water evaporates.

It is an object of this invention to provide a foraminous fibrous gas filter which will not be subject to one or more of the above disadvantages. Another object of this invention is the provision of a foraminous gas filter comprising fibrous material, individual fibers of which are coated with a fluid which will not be subject to one or more of said disadvantages. A further object of this invention is the provision of a method for producing such an improved gas filter. A further object of this invention is the provision of a coating composition useful for producing such improved gas filter. Other objects and advantages will appear as the description proceeds.

The attainment of the above objects is made possible by applicants' discovery that certain types of organic phosphate esters hereinafter more fully described are highly effective coating materials for use in producing gas filters of the type described above. More particularly, there is provided in accordance with this invention a foraminous gas filter comprising fibrous material, (1) Individual fibers of which are coated
(2) With a substantially non-volatile viscous liquid film consisting essentially of
(3) A member of the group consisting of
    (a) free mono- and di- acid phosphate esters of a condensation product of about 2.5 to 7 moles of an alkylene oxide of 2 to 4 carbon atoms with one mole of an aromatic compound selected from the groups consisting of
        (a–1) phenol,
        (a–2) naphthol,
        (a–3) halogenated derivatives thereof, and
        (a–4) alkylated derivatives thereof containing a maximum of about 6 alkyl carbon atoms;
    (b) the metal and ammonium salts of such free acid phosphate esters, and
    (c) mixtures thereof.

It has been found that the above defined coating materials are effective for providing the fibers of the filter with an adhesive, high boiling, essentially fire-resistant and non-flammable film which is readily water soluble and therefore readily rinsed from the filter with water preparatory to reapplication of a fresh coating. Further, these films are further advantageous in having improved antistatic properties which is a highly desirable safety feature for the prevention of explosions in the treatment of explosive gas mixtures.

The phosphate ester employed in the present invention are derived from condensation products of from 2.5 to 7 moles of an alkylene oxide with one mole of an aromatic compound as defined above. The alkylene oxide may be propylene oxide, butylene oxide, isopropylene oxide, isobutylene oxide, epichlorhydrin, or preferably ethylene oxide. As the aromatic compound to be condensed therewith, phenol is preferred, although there may be also employed naphthol, mono-, di- and tri-halogenated-phenol and -naphthol, up to and including completely halogenated phenol and naphthol, the halogen being preferably chlorine or bromine, and mono-, di- and tri-alkyl-phenol and -naphthol containing a total of no more than 6 alkyl carbon atoms such as mono-, di-, and tri-methyl- and -ethyl-phenol and -naphthol, mono- and di-propyl-phenol and -naphthol, ethyl-butyl-phenol and -naphthol, hexyl- and cyclohexyl-phenol and -naphthol, and the like.

The production of the foregoing condensation products of alkylene oxide with the defined aromatic compounds and their phosphation to produce the phosphate esters operative herein are described for example in U.S. Patents 3,004,056 and 3,004,057. Accordingly, such disclosures in said patents so far as they relate to the production of free mono- and di- acid phosphate esters defined above, their metal and ammonium salts and mixtures thereof are specifically incorporated herein by reference thereto. Such patent disclosures include column 1, line 43 to column 2, line 33, column 2, lines 40 to 48, column 4, line 49 to column 6 line 13, and Example 10 of U.S. Patent 3,004,056 and column 2, line 14 to column 3, line 17 and column 3, line 55 to column 6, line 7 of U.S. Patent 3,004,057.

While any method may be employed for phosphating the above defined condensation products, as for example by reaction thereof with polyphosphoric acid, phosphorous oxychloride and the like, unexpectedly improved results are obtained when phosphate esters are employed herein as produced by the processes disclosed in said U.S. Patents 3,004,056 and 3,004,057. The process of U.S. 3,004,056 broadly comprises reacting one mole of $P_2O_5$ with 2 to 4.5 moles of the said condensation product under substantially anhydrous conditions and at a temperature below about 110° C. down to about room temperature. The process of U.S. Patent 3,004,057 is an improvement thereover involving carrying out the aforementioned reaction in the presence of a small amount of a phosphorous-containing compound such as hypophosphorous acid, salts of hypophosphorous acid, phosphorous acid, and salts and esters of phosphorous acid, preferably hypophosphorous acid or sodium hypophosphite.

As pointed out in the aforementioned patents, the products there produced are complex in nature, generally containing about 20 to 45% of the secondary (mono-acid) phosphate ester, 30 to 80% of the primary (di-acid) phosphate ester, and 0 to 40% of the unreacted condensation product. Small amounts of unidentified by-products may also be present. A similar phosphating process may be employed in which relatively higher proportions of $P_2O_5$ are reacted with the condensation product, as for example from about 0.5 to 3 moles of $P_2O_5$ per mole of said product. Such a process would likewise yield mixtures of mono- and di-acid phosphate esters, though perhaps in different proportions with little or no tertiary phosphate esters.

The above described mono- and di-acid phosphate esters and mixtures thereof may be employed herein in their free acid form. It is generally preferred however for optimum results to employ these phosphate esters in the form of their partially or preferably completely neutralized salts containing as cations metals (including alkali metals, alkaline earth metals and other metals) and ammonium, as disclosed in column 5, lines 58 to 62 of U.S. Patent 3,004,056. Substantially completely neutralized salts having a pH of about 6 to 8 are preferred.

The triesters of phosphoric acid with the defined condensation product (tertiary phosphate esters) may also be employed in the present invention although less desirable than the described primary and secondary phosphate esters because of their higher ratio of carbon to phosphate and consequent tendency to increased flammability. These triesters may be prepared in known manner by reaction of the condensation product with, for example, phosphorous oxychloride, if desired in the presence of an acid-binding agent to neutralize the by-product HCl. Alternatively, the HCl may be removed by blowing, neutralization, crystallization or other known expedients. Small amounts of secondary phosphate esters (5–20%) and primary phosphate esters (2–10%) usually produced simultaneously with the phosphate esters may advantageously be allowed to remain in the mixture or may be removed by treatment with an ion exchange resin or other means.

The fibrous material to be coated with the above described phosphate esters may be of any type, size and configuration commonly employed heretofore in the production of gas filters. The fibers for example may be inorganic or organic, natural or synthetic, continuous filament or staple fiber, etc. Non-flammable fibers are preferred, particularly those of the inorganic type such as glass, metal, siliceous, calcareous, etc. Other fibers may be employed including cotton, linen, rayon, nylon, polyacrylonitrile, polyesters, polypyrrolidone, and other natural or synthetic organic polymeric fibrous material. The fibrous material should of course be foraminous to permit passage of the gas therethrough without undue obstruction but with maximum contact of the gas with the adhesively coated fibers. The structure may be uniform or non-uniform, woven or unwoven, with the openings therein uniformly or non-uniformly distributed therethrough. Glass wool batting is preferred, in addition to cotton batting, glass or cotton cloth, etc.

The above described organic phosphate esters are normally in more or less viscous liquid form and may be applied as such, in 100% form, to the fibrous material. Any method of application may be employed such as spraying, dipping, padding, etc. Optimum results with respect to efficiency of removal of dust is obtained by providing all the fibers with a continuous film of the phosphate ester. A discontinuous coating may however be provided as for example by spraying only the input or output side of the filter, by mixing coated fibers with non-coated fibers, and/or by printing in predetermined areas with the phosphate ester or the like. The individual fibers may likewise be continuously or discontinuously coated.

In some instances as, for example, when the viscosity of the phosphate ester is too high and/or when a lower proportion of phosphate ester in the fibrous material is desired, the phosphate esters may be applied from an aqueous medium containing up to 50% water and up to 20% of any water soluble thickening agent as for example Carbowax (polyethylene glycol or derivative) of up to 1500 or more molecular weight, polymerized mixtures of ethylene oxide and propylene oxide, carboxymethyl cellulose, starch, gum tragacanth, etc. Where the viscosity is too low, the phosphate ester liquid may be similarly thickened with one or more of said thickening agents in the stated amounts. The amounts, concentrations, viscosities, etc., and their manner of adjustment for providing individual fibers of the gas filter with a non-volatile viscous liquid film of the defined phosphate ester will be obvious and readily determinable by routine experimentation by the skilled worker.

The following examples are only illustrative of preferred embodiments of this invention and are not to be regarded as limitative. All parts and proportions referred to herein and in the appended claims are by weight unless otherwise indicated. All phosphate esters employed in the examples of the type described above in accordance with this invention are prepared in accordance with the processes disclosed in said U.S. Patents 3,004,056 and 3,004,057 by reaction of one mole of $P_2O_5$ with the indicated number of moles of the condensation product of one molecular equivalent of the indicated aromatic compound with the indicated number of molecular equivalents of ethylene oxide, followed where indicated by neutralization to produce the indicated salt of the resulting mixture of mono- and di-acid phosphate esters.

*Example 1*

In Table I below is shown the results of fire resistance tests. The "pipe cleaner" test employed has been found to correlate closely with tests carried out on glass wool. An ordinary cotton pipe cleaner (absorbent cotton batting on a wire base) is held to a depth of 1 inch in the indicated phosphate ester, allowed to drain for 5 minutes, then passed back and forth at a constant rate through a Bunsen burner flame set at a constant rate of flow of air and gas. All phosphate esters tested in this example are prepared from the condensation product of one mole of phenol with the indicated number of moles of ethylene oxide ("E.O."), followed by reaction of the condensation product with $P_2O_5$ in the molar ratio shown under "Ratio $P_2O_5$." The resulting mixture of mono- and di-acid esters is tested as such (no cation), or in the form of the indicated salt obtained by suitable neutralization of the free acid. The table shows that test (d) is outstanding. When tested for flammability by the Tag open cup method, all these fluids have a flash point of at least about 350° F. A similar test employing tricresyl phosphate shows 26 passes to the first flame.

TABLE I

| | Phosphate Ester | | Cation | Passes to First Flame |
|---|---|---|---|---|
| | E. O. | Ratio $P_2O_5$ | | |
| (a) | 2.5 | 4:1 | None | 10 |
| (b) | 2.5 | 2.7:1 | None | 19 |
| (c) | 5 | 2.7:1 | None | 28 |
| (d) | 6 | 2.7:1 | $NH_4$ | 43 |
| (e) | 6 | 2.7:1 | Na | 23 |
| (f) | 6 | 2.7:1 | Ba | 26 |
| (g) | 6 | 2.7:1 | None (1% $H_3PO_2$) | 28 |

*Example 2*

Table II below shows the comparative protection afforded by the ash formed when the treated fibers are burned. In this test, glass wool batting as used in air conditioner filters, and cotton cloth are thoroughly impregnated with the indicated treating agent, allowed to drain, and then held over a Bunsen burner until all burning ceases. Treating agent "P.E. 5" is the ammonium salt of the reaction product of one mole of $P_2O_5$ with 2.7 moles of the condensation product of one molecular equivalent of phenol with 5 molecular equivalents of ethylene oxide. The table shows that the organic phosphate esters employed in the present invention are surprisingly effective in protecting the fiber filter material.

TABLE II

| | Fiber | Treating Agent | Appearance | |
|---|---|---|---|---|
| | | | Initial | Final |
| (a) | Glass | Tricresyl phosphate. | Voluminous smoke. | Glass melts. |
| (b) | do | None | No smoke | Do. |
| (c) | do | P.E. 5 | Slight dark smoke. | Glass unmelted covered with black ash. |
| (d) | Cotton | P.E. 5 | Burns | Black residue retains original form powdered ash. |
| (e) | do | None | do | do |

*Example 3*

Table III below shows the results of an asbestos paper flammability test to determine the optimum number of moles of ethylene oxide to be reacted with phenol in the production of the ammonium salt of a phosphate ester mixture as employed in Example 2 above. This test is carried out by dipping a piece of asbestos paper in the fluid to a depth of 1 inch, allowing the paper to drain for 5 minutes, and then passing the paper back and forth through a Meeker preset to a constant gas flow, at a standard rate of two passes per second. The table shows that the product containing 6 oxyethylene groups has the best resistance to smoking and that the product containing 5 oxyethylene groups has the greatest resistance to burning. A similar test carried out with a commercial blend of tri-(o-phenyl)phenylphosphate with tricresylphosphate yields a product smoking after 5 passes, bubbling after 10 passes, and burning after 15 passes.

TABLE III

| E.O. | No. of Passes | | |
|---|---|---|---|
| | Smoking | Bubbling | Burning |
| 4 | 8 | 15 | 31 |
| 5 | 8 | 15 | 40 |
| 6 | 10 | 13 | 30 |
| 7 | 5 | 10 | 15 |

*Example 4*

Table IV below shows the results of an asbestos paper flammability test carried out to determine whether chemically bound chlorine contributes to non-flammability and whether the ammonium salt is better than the corresponding sodium salt. Chlorinated biphenyl is quite flammable by this test. The phosphate esters employed in this test were made by reaction of one mole of $P_2O_5$ with 2.7 moles of the condensation product of the indicated aromatic compound with the indicated number of moles of ethylene oxide, followed by neutralization to produce the indicated salt (cation). The results show that the use of trichlorophenol as the aromatic compound, though effective, yields no improvement over the use of phenol per se, and that when using phenol as the aromatic compound, the ammonium salt is substantially more effective than the sodium salt.

TABLE IV

| | Phosphate Ester | | Cation | No. of Passes | |
|---|---|---|---|---|---|
| | Aromatic Cpd. | E.O. | | Smoking | Burning |
| (a) | Trichlorophenol | 5 | Na | 5 | 10 |
| (b) | Phenol | 5 | Na | 5 | 13 |
| (c) | do | 5 | $NH_4$ | 8 | 39 |

This invention has been disclosed with respect to certain preferred embodiments and various modifications and variations thereof will become obvious to the person skilled in the art. It is to be understood that such modifications and variations are to be included within the spirit and scope of this invention.

We claim:
1. A foraminous fibrous gas filter,
   (1) the individual fibers of which are coated
   (2) with a substantially non-volatile viscous liquid film consisting essentially of
   (3) a member of the group consisting of
      (a) free mono- and di-acid phosphate esters of a condensation product of about 2.5 to 7 moles of an alkylene oxide of 2 to 4 carbon atoms with one mole of an aromatic compound selected from the group consisting of
         (a–1) phenol,
         (a–2) naphthol,
         (a–3) mono-, di- and trichlorinated- and -brominated phenol and -naphthol, and
         (a–4) mono-, di- and tri-alkylated-phenol and -naphthol containing a maximum of about 6 alkyl carbon atoms;
      (b) the metal and ammonium salts of such free acid phosphate esters, and
      (c) mixtures thereof.
2. A filter as defined in claim 1 wherein said fibers are glass.
3. A filter as defined in claim 1 wherein said aromatic compound is phenol.
4. A filter as defined in claim 1 wherein said alkylene oxide is ethylene oxide.
5. A filter as defined in claim 1 wherein said member is a mixture of said free mono- and di-acid phosphate esters.
6. A filter as defined in claim 1 wherein said member is the metal salts of a mixture of said free mono- and di-acid phosphate esters.
7. A filter as defined in claim 1 wherein said member is the ammonium salts of a mixture of said free mono- and di-acid phosphate esters.
8. A filter as defined in claim 1 wherein said aromatic compound is trichlorophenol.
9. A filter as defined in claim 1 wherein said member is the ammonium salts of a mixture of free mono- and di-acid phosphate esters of the condensation products of 5 to 6 moles of ethylene oxide with one mole of phenol.

References Cited by the Examiner
UNITED STATES PATENTS

| | | | |
|---|---|---|---|
| 2,347,031 | 4/1944 | Cupery | 55—524 XR |
| 2,974,066 | 3/1961 | Macura et al. | 260—461 |
| 3,004,056 | 10/1961 | Nunn et al. | 252—351 |
| 3,033,889 | 5/1962 | Chiddix et al. | 260—461 |
| 3,061,506 | 10/1962 | Nunn et al. | 260—461 |

JULIUS GREENWALD, *Primary Examiner.*

ALBERT T. MEYERS, *Examiner.*